(12) United States Patent
Thorsen

(10) Patent No.: US 6,637,370 B1
(45) Date of Patent: Oct. 28, 2003

(54) VALVE DEVICE FOR AUTOMATIC SLUICING OF DOMESTIC ANIMALS

(75) Inventor: Roland Thorsen, Horsens (DK)

(73) Assignee: Hanne Korsgaard Nielsen, Horsens (DK)

(*) Notice: Subject to any disclaimer, the term of this patent is extended or adjusted under 35 U.S.C. 154(b) by 0 days.

(21) Appl. No.: 10/130,422
(22) PCT Filed: Nov. 16, 2000
(86) PCT No.: PCT/DK00/00640
§ 371 (c)(1), (2), (4) Date: May 29, 2002
(87) PCT Pub. No.: WO01/37648
PCT Pub. Date: May 31, 2001

(30) Foreign Application Priority Data

Nov. 17, 1999 (DK) .................................... 1999 00407 U

(51) Int. Cl.⁷ ................................................ A01K 7/00
(52) U.S. Cl. ................................................... 119/75
(58) Field of Search .......................... 119/72, 75, 74, 119/73

(56) References Cited

U.S. PATENT DOCUMENTS

| 2,534,475 A | 12/1950 | Peterson | 119/75 |
| 3,831,558 A | 8/1974 | Forbes | 119/73 |
| 4,813,378 A | 3/1989 | Lapp | 119/73 |
| 4,986,221 A * | 1/1991 | Shaw | 119/73 |
| 6,279,508 B1 * | 8/2001 | Marchant et al. | 119/75 |
| 6,363,960 B1 * | 4/2002 | Gauss | 137/60 |

FOREIGN PATENT DOCUMENTS

| RU | SU 1026728 | 7/1983 |
| RU | SU 1187768 | 10/1985 |

* cited by examiner

Primary Examiner—Charles T. Jordan
Assistant Examiner—Judith A. Nelson
(74) Attorney, Agent, or Firm—James Creighton Wray; Meera P. Narasimhan

(57) ABSTRACT

A valve device for self-watering of livestock has a valve with a valve housing located in frost-free surroundings, a subterranean well. The valve device has a sliding valve body arranged to open by actuation of an animal for discharging water through an outlet opening provided in a delivery tube. Water is discharged into a drinking bowl or nozzle disposed at a level above ground convenient for the animal. The valve body is arranged to close for water discharge through the outlet opening under subjection of water pressure in an inlet opening. The valve body may be controlled remotely from the drinking bowl or the nozzle. The valve body is arranged such that the delivery tube and the valve housing are automatically emptied of water when the valve is closed, for example, when only the valve body is subjected to water pressure.

8 Claims, 2 Drawing Sheets

VALVE DEVICE FOR AUTOMATIC SLUICING OF DOMESTIC ANIMALS

This application claims the benefit of Danish Application No. BA 1999 00407 filed Nov. 17, 1999 and PCT/DK00/00640 filed Nov. 16, 2000.

BACKGROUND OF THE INVENTION

The present invention concerns a valve device for self-watering of livestock and of the kind indicated in the preamble of claim 1.

In the winter half, where freezing temperatures may occur, it is a recognised problem that usually there is a relatively great manual and time-consumning work connected with ensuing fresh drinking water for livestock in outdoor stable facilities or on fields.

SUMMARY OF THE INVENTION

It is the purpose of the invention to provide a new and improved valve device of the kind mentioned in the introduction and which by means of simple measures enables arrangement of outdoor frost-proof self-watering of farm animals.

The valve device according to the invention is characterised in that said valve body is arranged to close for discharge of water through the said outlet opening under subjection of the water pressure in an inlet opening, that the said valve body is arranged to be remote controlled from the said drinking bowl or nozzle, and that said valve is so arranged that the delivery tube and the valve housing are automatically emptied of water when the valve is closed, i.e. when only the valve body is subjected to the water pressure. By means of simple measures it hereby becomes possible to arrange outdoor frost-proof self-watering of farm animals.

Suitably, the valve device according to the invention may be thus designed that the drinking bowl is mounted at an upper end of a mainly vertical steel pipe fastened on the inner wall of a well pipe, e.g. a corrugated well pipe of plastic anchored in the ground, that the valve is fitted at the lower end of the steel pipe, preferably on a lateral flange thereof, that said delivery tube and said remote control are passed through the steel pipe.

In a particularly simple way it may be advantageous that a valve device according to the invention is thus designed that opposite to the inlet opening, the valve housing is designed with a transversely disposed slit for an actuation arm extending transversely to the valve body and being connected at a free end section with a tension wire which is connected with an actuation bracket with a tongue member disposed in the drinking bowl or at the drinking nozzle.

The valve device according to the invention is preferably so designed that the valve housing and the valve body, respectively, are so designed that the inlet opening, the outlet opening and the drain opening may all be shut off simultaneously.

The invention is explained in more detail in the following in connection with the drawing on which:

DETAILED DESCRIPTION OF THE PREFERRED EMBODIMENTS

Figure 1:
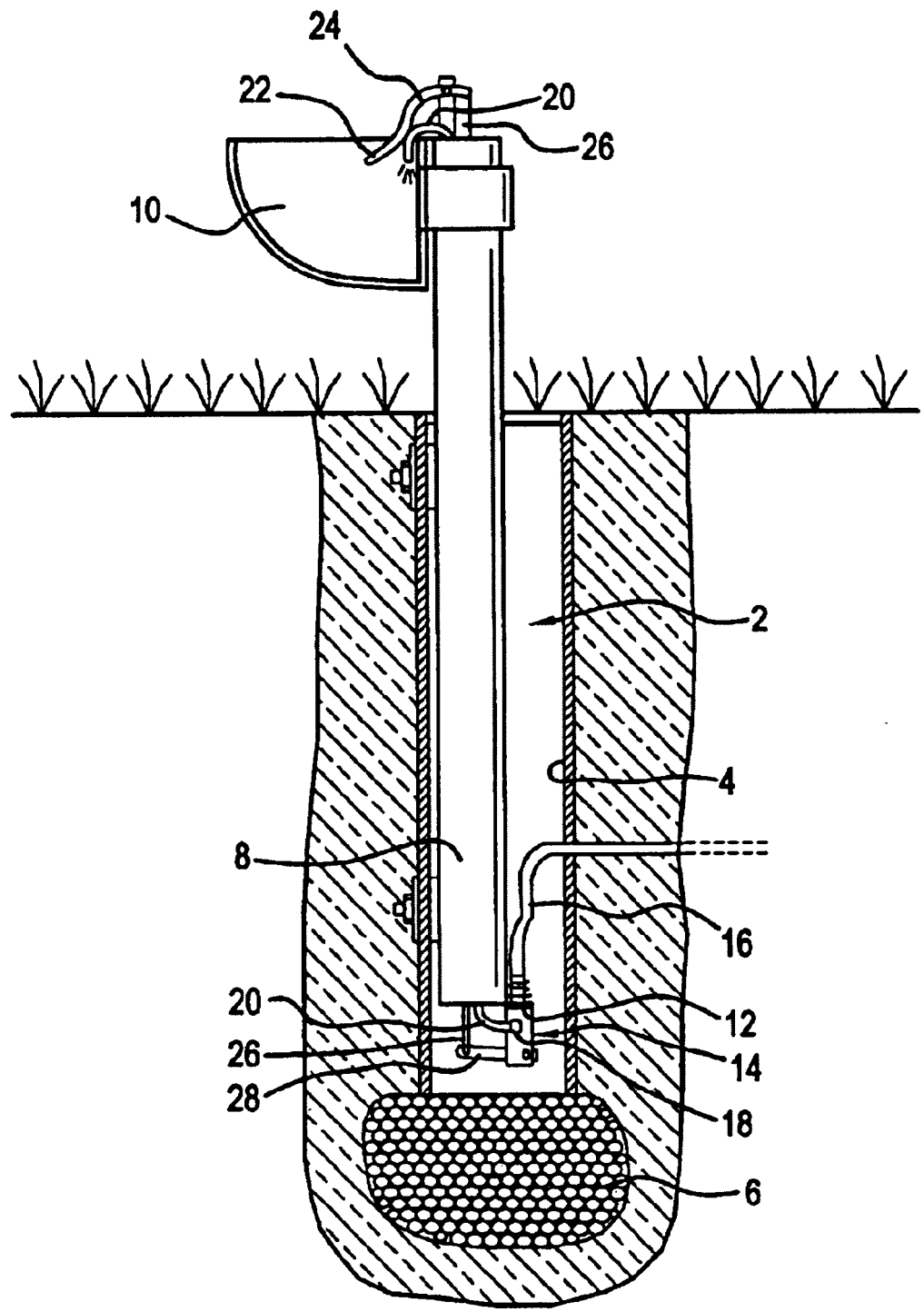
FIG. 1 shows a view, partly in section, of a preferred embodiment of a valve device according to the invention.

The valve device 2 shown in FIG. 1, which, for example, is intended for frost-proof, outdoor self-watering of horses or cattle, comprises a relatively narrow, vertical well pipe 4 that e.g. consists of corrugated plastic tubing and has a length of 90–100 cm. At the bottom, the well pipe 4 is drained by means of a so-called culvert 6. At the inner wall of the well pipe 4 is fastened a steel pipe 8, the lower end of which is disposed at a distance from the bottom of the well pipe 6 and at the upper end of which is fitted a drinking bowl 10 or a drinking nozzle.

At the lower end of the steel pipe 8, a valve 14 (FIG. 2) is mounted on a projecting flange 12 and is supplied with drinking water under pressure via a supply tube 16, the valve 14 being connected via a lateral stub 18 with a thin plastic tube 20 extending upward through the steel pipe 8 and discharging in the drinking bowl 10 or the drinking nozzle. The valve 14 is remotely controlled by means of an actuating part 22 of an actuation bracket 24 which by means of a tension wire 26 is connected with a transversely disposed actuating arm 28 of the valve 14.

Figure 2:
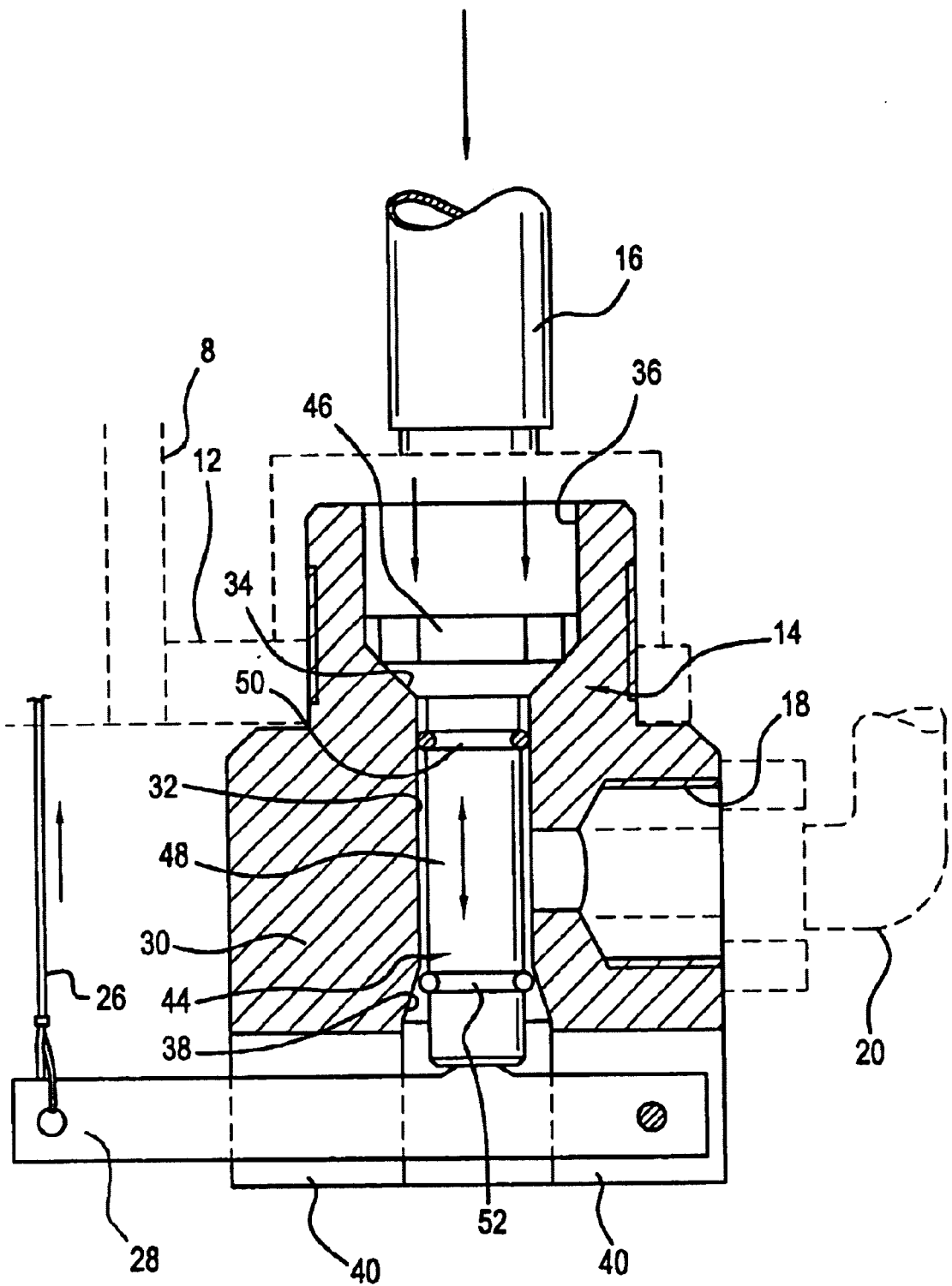
FIG. 2 shows a sectional view of a preferred embodiment of a valve for a valve device according to the invention.

The valve 14, which is shown in more detail in FIG. 2, comprises a valve housing 30 with a central boring 32 having a funnel-shaped part 34 for an upper boring part 36 with greater diameter at the top. At the bottom, the boring 32 also has a part 38 with slightly enlarged diameter where the valve housing 30 is designed with a transversely directed through-going slit 40. The central boring 32 is formed with the lateral stub 18.

The valve 14 comprises a valve body 44 having an enlarged part 46 at the top which fits into the funnel-shaped part 34 and which has hexagonal shape out towards the boring part 36 so that water may more easily pass by the enlarged parts of the valve body 44 when this is slid upwardly for opening the valve 14. A central, cylindric part 48 of the valve body 44 is provided with an upper sealing ring 50 and a lower sealing ring 52 in the shape of O-rings fitting into the central boring 32.

The distance between the upper and lower sealing rings 50 and 52 are thus adjusted so that connection may be formed between the boring part 36 and the lateral stub 18 by sliding the valve body 44 and the upper sealing ring 50 upward by means of the transversely disposed actuating arm 28 which is effectively connected with the actuating bracket 24 by means of a tension wire 26, i.e. the upper sealing ring 50 is moved out of the central boring 32 simultaneously with the lower sealing ring 52 being moved into the boring 32. The valve 14 is open, i.e. water from the supply tube 16 is allowed to flow through the valve 14 and out through the lateral stub 18 and right up to the drinking bowl 10 or the drinking nozzle via the thin plastic tube 20.

The distance between the upper and lower sealing rings 50 and 52 is also adjusted so that when the valve 14 closes by downward movement of the valve body 44 under action of gravity and/or the water pressure in the boring part 36, connection is formed between the lateral stub 18 and the lower boring part 38, i.e. the amount of water in the thin plastic tube 20 and in the valve 14 itself is drained off at the bottom of the boring part 38 so that the valve body 2 as a whole is safeguarded against being blocked by frozen water.

The distance between the upper and lower sealing rings 50 and 52 are also so adjusted that by adjusting the length, i.e. shortening the tension wire 26, a controlled state may be achieved, which may be used with advantage in the summer half, namely where the lower sealing ring 52 is not moved out of the central boring 32 when the valve 18 is closed. Even though water spillage is minimal due to the thin plastic tube 20, water spillage may thus be completely avoided in the summer half if the bottom position of the valve body 44 is lifted so that the lower sealing ring 52 is in sealing engagement with the central boring 32 all the time.

What is claimed is:

1. A valve device for self-watering of livestock and comprising a valve with a valve housing located in frost-free surroundings, and comprising a sliding valve body arranged to open by actuation of an animal for discharging water through an outlet opening which is provided with a delivery tube discharging into a drinking bowl or nozzle disposed at a level convenient for the animal above the ground, wherein said valve body is arranged to close for discharge of water through said outlet opening under subjection of a water pressure in an inlet opening, wherein said valve body is arranged to be remote controlled from said drinking bowl or nozzle, and wherein said valve is so arranged that the delivery tube and the valve housing are automatically emptied of water when the valve is closed.

2. The valve device of claim 1, wherein the drinking bowl is mounted at an upper end of a mainly vertical steel pipe fastened on the inner wall of a well pipe, wherein the valve is fitted at the lower end of the steel pipe, and wherein said delivery tube and said remote control are passed through the steel pipe.

3. The valve device of claim 1, wherein opposite to the inlet opening, the valve housing is designed with a transversely disposed slit for an actuation arm extending transversely to the valve body and being connected at a free end section with a tension wire which is connected with an actuation bracket with a tongue member disposed in the drinking bowl or at the drinking nozzle.

4. A The valve device of claim 1, wherein the valve housing and the valve body, respectively, are so designed that the inlet opening, the outlet opening and the drain opening may all be shut off simultaneously.

5. The valve device of claim 1, wherein the frost-free surroundings is in a subterranean well.

6. The valve device of claim 1, wherein the delivery tube and the valve housing are automatically emptied of water when only the valve body is subjected to the water pressure.

7. The valve device of claim 2, wherein the well pipe is a corrugated well pipe of plastic anchored in the ground.

8. The valve device of claim 2, wherein the valve is fitted at the lower end of the steel pipe on a lateral flange thereof.

* * * * *